7910X
J. L. Mott,
Magazine Stove.
Patented Dec. 30. 1833.
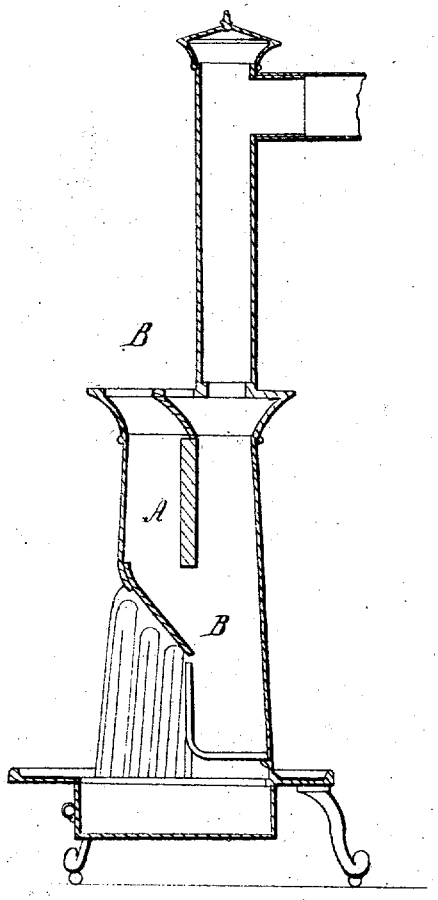
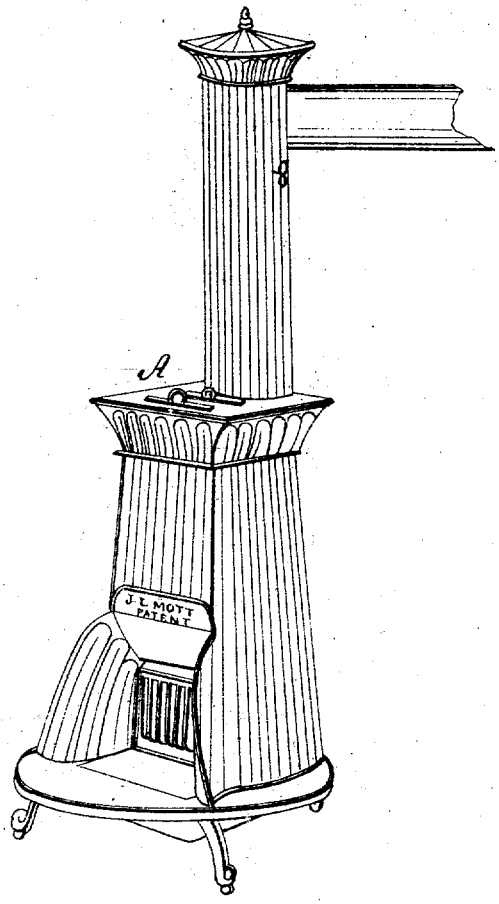

12/30/1833 7910X

Dec 30 1833 77.

Jordan L Mott New York City

Letters Patent

The Schedule referred to in these Letters Patent and making part of the same
containing a description in the words of the said Jordan L Mott himself of his
improvement in Stoves To all to whom these presents shall come. Be it known that I Jor-
dan L Mott of the City and State of New York have invented and applied
to use a new and useful improvement in Stoves in which the advantages
of that peculiar kind of Stoves called open Franklins are combined with
the advantages of close Stoves and that the following is a full and exact
description of the said new kind of Stove as invented or improved by me
The Stove as made by me is a parallelopiped or rather a frustum
of a pyramid of any required dimensions [illegible] e horizontal plate and hav-
ing the lower part * of one of its sides open to any suitable height with pieces
projecting on the right and left of the side so left open and flaring as is
used in Franklins thus forming the front of the Stove. A grate with bars
standing perpendicularly and bending horizontally at their lower ends is placed
near the bottom of the Stove and with the front or perpendicular part of the grate
about equally distant from the front and back part of the Stove. A plate or
other plates extend from a short distance above the top of the grate in a
position inclining upwards to the front of the Stove and join closely to the top
of the open part of the parallelopiped — Thus the Stove presents in its front
the appearance of an open Franklin for about one half its height and above that
is a close Stove. Through the middle of the close part of the Stove and near-
ly or quite on a line with * front of the grate a partition placed vertically divides
the front part from the back part of the Stove. The fuel which may be of an-
thracite or any other kind of coal or turf &c is placed in the front division and
having for its bottom an inclined plane it falls gradually into the grate and
as the draft is through the bars of the grate into a close Stove it burns when
ignited similar to an open fire — The form and appearance of the

* The [illegible] 8 August [illegible]

1910X above described Stove will be more fully apparent on an inspection of the model
and the drawings deposited by me in the Patent office Washington The drawing marked A presents in perspective a view of the front of the
Stove, showing the grate the flaring sides [illegible] the Franklin part of the Stove
The two connecting plates one of them marked "J L Mott Patent" On
the top of the Stove are two small covers placed over apertures in the top. The
one leading into the front division of the close part of the Stove, serves for
the introduction of the fuel with which this division of the stove may be
filled as often as is necessary. The other cover closes an aperture over which
a vessel may be placed for boiling water &c. In this drawing a fluted col
umn extends perpendicularly upwards to which the pipe of the Stove is affixed.
This part however is chiefly for ornament The drawing marked B is a sectional view through the middle of the
Stove at right angles with the front. It shows the position of the grate and the
form of the bars and the mode adopted by me for increasing the flare of the
Franklin part of the Stove having separate flaring pieces attached to the
body of the Stove; as also the partition (made of soap stone) which separates
the body of the Stove vertically into two divisions. The one division marked "A."
containing the fuel, the other marked B. being the fire.

The width & height of the Franklin part of the stove may be of any
desired size and the grate by being placed at a greater or less distance
from the back of the stove may be rendered more or less capacious. and the
connecting plate or plates may be either more or less inclined. The chief
object designed to be effected by the connecting plate or plates is to cause the
draft to be through the body of the coal or rather through the middle
of the close part of the Stove. which would not be the case if the grate
was placed in the front. The connecting plate or plates may be made of a form
somewhat circular which will not only improve the appearance of the front
of the Stove but also aid in throwing the draft to the middle of the stove.
The position of the grate as described above causes the heat to be principal
ly generated in the franklin part of the stove and distributed through the
close part so that it is not necessary in ordinary cases to line the parts
immediately adjacent to the fire — This however may be done and also

1910X small pieces may be attached to or near the end of the grate to protect
the sides of the Stove. The partitions in the upper or close part of the
stove may be omitted but in that case many although by no means all the
advantages of the Stove as above described will not be gained. The Stove may
be made of any material that will resist the action of fire and in a great
variety of forms — That which I now claim in the above described
Stove as improved by me is the combining the open Franklin with the
close Stove by connecting the grate which is thrown back by a plate or
plates with the close part of the Stove — the one stove being thus placed as
it were above or higher than the other. October 31st 1833

Witnesses
Lawrence I. Mott
Robert [illegible] Jr.

Jordan L. Mott (Dr. in Portfolio)

Exd. [illegible]

[illegible]